(12) United States Patent
Bois et al.

(10) Patent No.: US 8,317,482 B2
(45) Date of Patent: Nov. 27, 2012

(54) SWEPT TURBOMACHINE BLADE

(75) Inventors: Beatrice Nathalie Bois, Evry Gregy sur Yerres (FR); Alain Paul Madec, Chartrettes (FR); Amadou Lamine M'Bengue, Vert Saint Denis (FR)

(73) Assignee: SNECMA, Paris (FR)

( * ) Notice: Subject to any disclaimer, the term of this patent is extended or adjusted under 35 U.S.C. 154(b) by 1095 days.

(21) Appl. No.: 11/934,318

(22) Filed: Nov. 2, 2007

(65) Prior Publication Data

US 2008/0107538 A1    May 8, 2008

(30) Foreign Application Priority Data

Nov. 8, 2006 (FR) .................................. 06 54775

(51) Int. Cl.
    *B64C 11/18* (2006.01)
(52) U.S. Cl. .................................... 416/228; 416/241 R
(58) Field of Classification Search .................. 416/228, 416/238, 241 R
    See application file for complete search history.

(56) References Cited

U.S. PATENT DOCUMENTS

| | | | | |
|---|---|---|---|---|
| 3,972,646 A | * | 8/1976 | Brown et al. | ................. 416/228 |
| 4,012,172 A | * | 3/1977 | Schwaar et al. | ............... 416/228 |
| 6,071,077 A | * | 6/2000 | Rowlands | ................. 416/223 A |
| RE38,040 E | | 3/2003 | Spear et al. | |
| 7,108,486 B2 | * | 9/2006 | Talbotec et al. | ............... 416/243 |
| 2005/0254956 A1 | | 11/2005 | Dutton et al. | |

FOREIGN PATENT DOCUMENTS

| | | |
|---|---|---|
| EP | 1 106 836 A2 | 6/2001 |
| WO | WO 96/00841 | 1/1996 |

* cited by examiner

*Primary Examiner* — Ninh H Nguyen
(74) *Attorney, Agent, or Firm* — Oblon, Spivak, McClelland, Maier & Neustadt, L.L.P.

(57) ABSTRACT

A turbomachine blade including a plurality of blade sections stacked along a radial axis is disclosed. The projection of a line interconnecting the leading edges of the blade sections of the bottom stack onto a mid-plane presents a first longitudinal angle of inclination towards the leading edge that lies in the range 10° to 25°. The projection of a line interconnecting the leading edges of the blade sections of the intermediate stack presents a second longitudinal angle of inclination towards the trailing edge lying in the range 10° to 25°. The projection of a line interconnecting the leading edges of the blade sections of the top stack presents a third longitudinal angle of inclination towards the trailing edge lying in the range 20° to 50°. The bottom limit of the intermediate stack of the blade sections lies in the range 30% to 40% of the total radial height of the stack of blade sections.

9 Claims, 2 Drawing Sheets

SWEPT TURBOMACHINE BLADE

BACKGROUND OF THE INVENTION

The present invention relates to the general field of moving blades for turbomachines such as the blades for the fan of a turbomachine.

The fan blades of a turbomachine are subjected to speeds of rotation that can impart subsonic to supersonic speeds to the gas flow passing through the fan. Although high flow speeds make it possible in particular to improve the flow rate of the gas so as to increase the thrust of the turbomachine, they nevertheless present the drawback of generating a large amount of noise. In particular, the "supersonic shockwave" corresponding to the changeover from supersonic speeds to subsonic speeds in the gas flow contributes a major fraction of this noise. Other interaction phenomena involving the turbulence of the gas flow in the proximity of the fan (broadband noise) also constitute sources of noise.

Engine manufacturers therefore seek to design fan blades that enable thrust to be increased, while minimizing the noise generated by the gas flow. In addition, when designing such blades, various other parameters need to be taken into account such as aerodynamic and mechanical considerations involving the blades. The blades need to be designed so as to optimize the flow rate and the compression of the gas flow passing through the fan while guaranteeing that the blades present good mechanical strength. In particular, at high speeds of rotation, the mechanical stresses to which the blades are subjected are very severe because of the high levels of vibration and because of the centrifugal force that is applied to the blades.

Numerous fan blade shapes have been proposed. They are characterized mainly by their relationships for stacking blade sections, by their general curvature, and by the optional presence of a swept shape for the purpose of improving aerodynamic performance and reducing the noise generated by the fan. Nevertheless, none of those blades makes it possible to obtain aerodynamic operation that is effective under all conditions of use of the turbomachine, in particular at full power (e.g. during takeoff and at the end of the airplane climbing) and at partial power (e.g. during the approach stage of the airplane), while complying with noise standards that are becoming more and more strict.

OBJECT AND SUMMARY OF THE INVENTION

A main object of the present invention is thus to mitigate such drawbacks by proposing a new shape for a turbomachine blade that enables good aerodynamic operation to be guaranteed under all operating conditions of the turbomachine, while minimizing the noise generated.

This object is achieved by a blade comprising a plurality of blade sections stacked along a radial axis, each blade section extending along a longitudinal axis between a leading edge and a trailing edge and along a tangential axis between a pressure side face and a suction side face, the stack of blade sections being subdivided along the radial axis into a bottom stack, an intermediate stack, and a top stack, the bottom stack extending from a root of the blade to a bottom limit of the intermediate stack, the intermediate stack extending from the bottom limit to a top limit, and the top stack extending from the top limit of the intermediate stack to a tip of the blade, and in which, in accordance with the invention:

the projection of a line interconnecting the leading edges of the blade sections of the bottom stack onto a mid-plane formed by the longitudinal axis and the radial axis presents a first longitudinal angle of inclination towards the leading edge that lies in the range 10° to 25° relative to said radial axis;

the projection of a line interconnecting the leading edges of the blade sections of the intermediate stack onto the mid-plane presents a second longitudinal angle of inclination towards the trailing edge lying in the range 10° to 25° relative to said radial axis;

the projection of a line interconnecting the leading edges of the blade sections of the top stack onto the mid-plane presents a third longitudinal angle of inclination towards the trailing edge that lies in the range 20° to 50° relative to said radial axis; and the bottom limit of the intermediate stack of the blade sections lies in the range 30% to 40% of the total radial height of the stack of blade sections measured from the root of the blade.

The Applicant has found that the presence of a belly (corresponding to the bottom limit of the intermediate stack) at a height lying in the range 30% to 40% of the total height of the blade, combined with the angles of inclination of the leading edge as defined above serves to improve considerably the aerodynamic performance of the turbomachine, in particular at high power. At high specific flow, this means that there is a large increase in the efficiency of the fan of a turbomachine fitted with such blades. The acoustic characteristics of the blade are also improved. In addition, the blade of the invention satisfies criteria for mechanical balancing and manufacturability using composite material.

According to an advantageous characteristic, the bottom stack also possesses a line interconnecting the centers of gravity of its blade sections which, in projection onto a tangential plane formed by the longitudinal axis and the radial axis, presents a first tangential angle of inclination lying in the range −10° to 10° relative to the radial axis; the intermediate stack also possesses a line interconnecting the centers of gravity of its blade sections having a projection onto the tangential plane that presents a second tangential angle of inclination lying in the range −20° to 0° relative to the radial axis; and the top stack also possesses a line interconnecting the centers of gravity of its blade sections having a projection onto the tangential plane that presents a third tangential angle of inclination lying in the range −40° to −20° relative to the radial axis.

Preferably, the projection of the line interconnecting the leading edges of the top stack onto the mid-plane further presents, for the tip sections a fourth longitudinal angle of inclination towards the leading edge.

The intermediate and top stacks may extend over radial heights that are substantially identical.

The invention also provides a fan and a turbomachine having a plurality of blades as defined above.

BRIEF DESCRIPTION OF THE DRAWINGS

Other characteristics and advantages of the present invention appear from the following description with reference to the accompanying drawings that show an embodiment having no limiting character. In the figures.

DETAILED DESCRIPTION OF EMBODIMENTS

Figure 1:
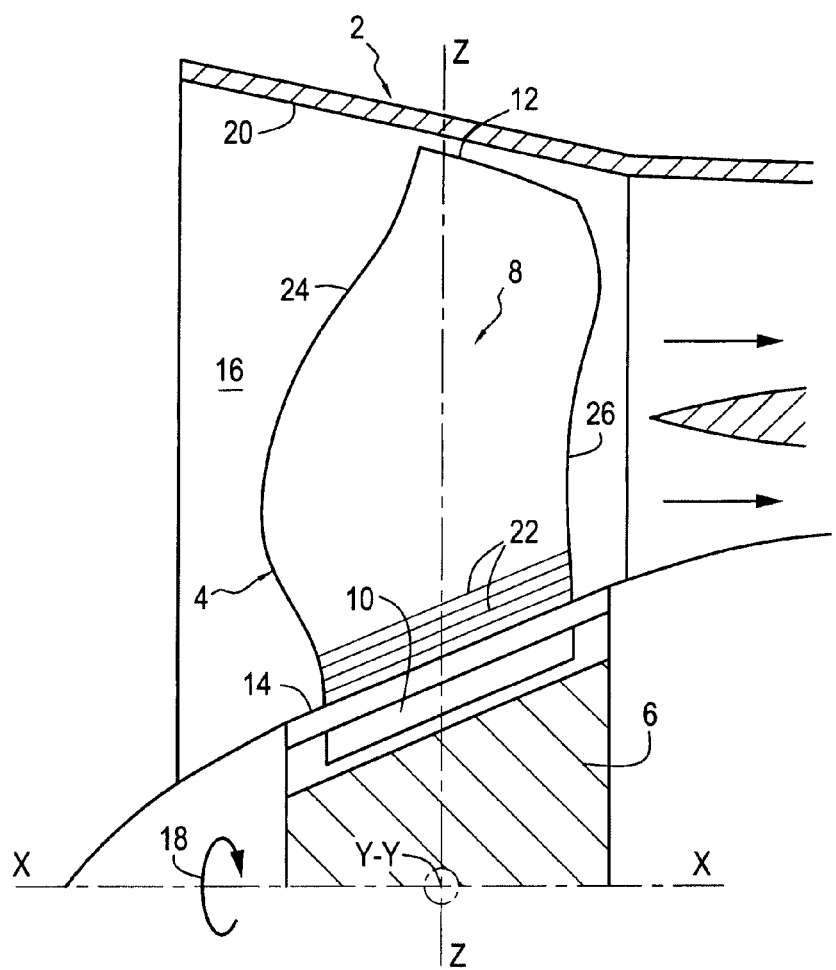
FIG. 1 is a fragmentary longitudinal section view of a turbomachine fan fitted with blades of the invention.

FIG. 1 is a diagrammatic and fragmentary view of the fan 2 of an aviation turbomachine. It is made up of a plurality of blades 4 that are regularly spaced apart around a disk 6 (or hub) of a rotor centered on a longitudinal axis X-X of the fan.

In known manner, each blade 4 comprises in particular an airfoil 8, a root 10, and a tip 12. The root 10 of the blade is mounted on the rotor disk 6 and is connected to the airfoil 8 via a platform 14 defining the inside of the flow passage 16 of a gas stream passing through the fan. The rotor disk 6 is driven in rotation about the longitudinal axis X-X in the direction marked by arrow 18. The tip 12 of the blade is situated facing the inside face 20 of a stationary annular casing of the fan, said face 20 defining the outside of the passage 16.

The airfoil 8 is made up of a plurality of blade sections 22 that are stacked along a radial axis Z-Z perpendicular to the axis X-X. The blade sections 22 are situated at increasing radial distances from the longitudinal axis X-X. The stack that results therefrom forms an aerodynamic surface extending along the longitudinal axis X-X between a leading edge 24 and a trailing edge 26, and along a tangential axis Y-Y of the fan between a pressure side face and a suction side face (these faces are not shown in the figures).

It should be observed that the longitudinal axis X-X, the tangential axis Y-Y, and the radial axis Z-Z of the fan as defined in this way form a right-handed rectangular frame of reference.

Figure 2A:
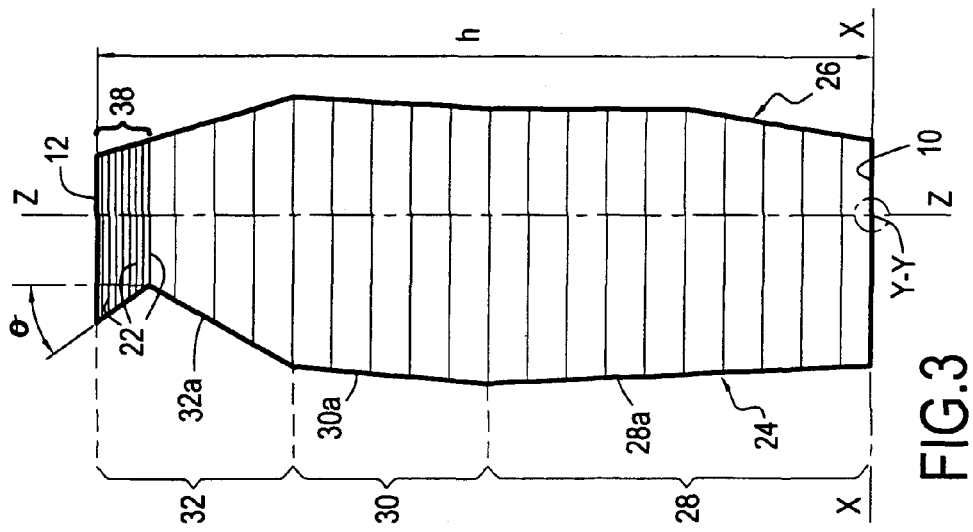
FIGS. 2A and 2B are views of a blade of the invention respectively in a mid-plane and a tangential plane.
Figure 2B:
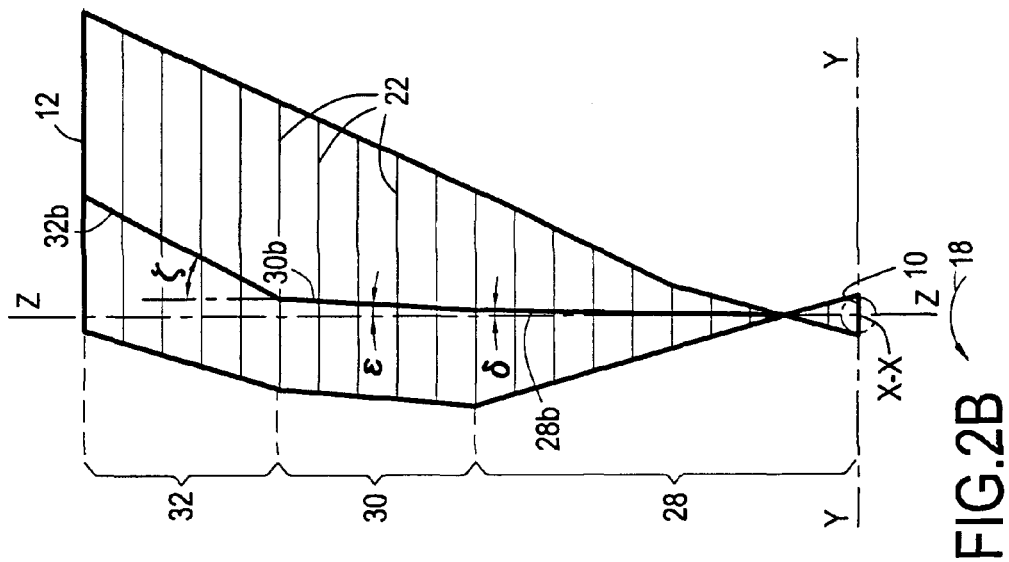

As shown in FIGS. 2A and 2B, the stack of blade sections 22 is subdivided along the radial axis Z-Z into a bottom stack 28, an intermediate stack 30, and a top stack 32.

Starting from the blade root 10, the bottom stack 28 extends along the radial axis Z-Z from the root up to a bottom limit 34 of the intermediate stack 30. The line 28a interconnecting the leading edges 24 of the blade sections in the bottom stack 28 presents in projection onto a mid-plane (formed by the longitudinal axis X-X and the radial axis Z-Z, and shown in FIG. 2A) a first longitudinal angle of inclination $\alpha$ that is directed towards the leading edge 24 of the blade (i.e. towards the front of the fan).

The intermediate stack 30 extends along the radial axis Z-Z between the bottom limit 34 and a top limit 36. The line 30a interconnecting the leading edges 24 of the blade sections in this stack 30 presents, in projection onto the mid-plane, a second longitudinal angle of inclination $\beta$ that is directed towards the trailing edge 26 of the blade (i.e. towards the rear of the fan).

The top stack 32 extends along the radial axis Z-Z between the top limit 36 of the intermediate stack 30 and the tip 12 of the blade. The intermediate and top stacks 30 and 32 preferably extend over substantially identical radical heights. Furthermore, the line 32a interconnecting the leading edge 24 of the blade sections in this stack 32 present, in projection onto the mid-plane, a third longitudinal angle of inclination $\gamma$ that is directed towards the trailing edge 26 of the blade.

As a result, the line 28a, 30a, 32a interconnecting the leading edges of all of the sections of the blade presents, in projection onto the mid-plane, a profile having a minimum longitudinal abscissa point, referred to as the "blade belly" that is situated at the bottom limit 34 of the intermediate stack 30.

According to the invention, the blade belly (or the bottom limit 34 of the intermediate stack 30 of blade sections) lies between 30% to 40% of the total height h of the stack of blade sections, this height being measured from the root 10 towards the tip 12 of the blade along the radial axis Z-Z.

By definition, it is considered that the blade section situated at 0% of the height h corresponds to the radius where the leading edge 24 intersects the innermost streamline of the gas flow, and the section situated at 100% is at the point of height h where the outermost streamline of the flow is on the same longitudinal abscissa as the section situated at 0%.

Still in the invention, the first longitudinal angle of inclination $\alpha$ of the projection of the line 28a interconnecting the leading edges of the bottom stack 28 lies in the range 10° to 25° relative to the radial axis Z-Z, the second longitudinal angle of inclination $\beta$ of the projection of the line 30a interconnecting the leading edges of the intermediate stack 30 lies in the range 10° to 25° relative to the radial axis, and the third longitudinal angle of inclination $\gamma$ of the projection of the line 32a interconnecting the leading edges of the top stack 32 lies in the range 20° to 50° relative to the radial axis.

According to an advantageous characteristic of the invention, shown in FIG. 2B, the bottom stack 28 also possesses a line 28b interconnecting the centers of gravity of the blade sections which, in projection onto a tangential plane (formed by the tangential axis Y-Y and the radial axis Z-Z), presents a first tangential angle of inclination $\delta$ that lies in the range −10° and 10° relative to the radial axis Z-Z.

Similarly, the intermediate stack 30 preferably possesses a line 30b interconnecting the centers of gravity of its blade sections which, in projection onto the tangential plane, presents a second tangential angle of inclination $\epsilon$ that lies in the range −20° to 0° relative to the radial axis Z-Z.

Finally, the top stack 32 advantageously possesses a line 32b interconnecting the centers of gravity of its blade sections presenting, in projection onto the tangential plane, a third tangential angle of inclination $\zeta$ that lies in the range −40° to −20° relative to the radial axis Z-Z.

It should be observed that for these lines 28b, 30b, 32b interconnecting the centers of gravity of the blade sections, a negative tangential angle of inclination corresponds to an angle of inclination in the opposite direction to the direction of rotation of the blade, while a positive tangential angle of inclination extends in the direction of rotation of the blade.

The blade of the invention as defined in this way is characterized by the combination of a belly that is relatively low and pronounced, with a strongly pronounced rearward sweep in both the longitudinal and tangential directions.

Figure 3:
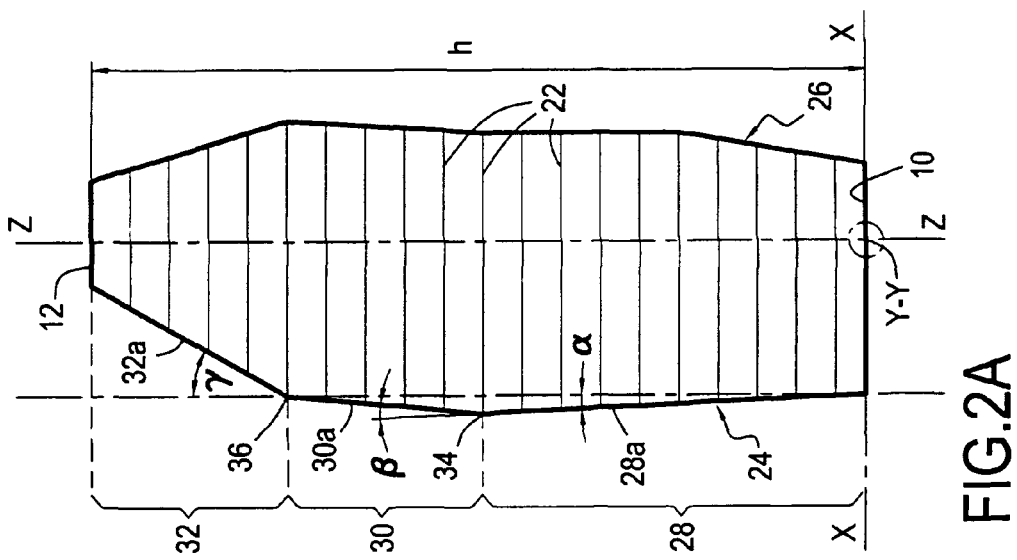
FIG. 3 is a view in a mid-plane of a variant embodiment of a blade of the invention.

In a variant embodiment of the invention shown in FIG. 3, it is possible to add a small amount of forward sweep to the tip sections of the blade, otherwise presenting the shape described above.

This forward sweep represents the fact that the projection of the line 32a interconnecting the leading edges of the top stack 32 presents, in the mid-plane, and level with the tip sections 38, a fourth longitudinal angle of inclination $\theta$ towards the leading edge 24.

The term "tip sections" is used to mean blade sections 38 that lie in the range 80% to 100% of the total height h of the stack of blade sections 22.

Such a longitudinal angle of inclination $\theta$ corresponds to a forward sweep of the tip sections 38 that serves in particular to improve the mechanical behavior of the blade. The forwardly-swept tip sections have the advantage of balancing the blade while limiting differences between the centers of gravity of the blade sections, but without that affecting the aerodynamic performance of the blade.

By way of example, this forced longitudinal angle of inclination θ towards the leading edge may lie in the range 5° to 20°.

Figure 4:
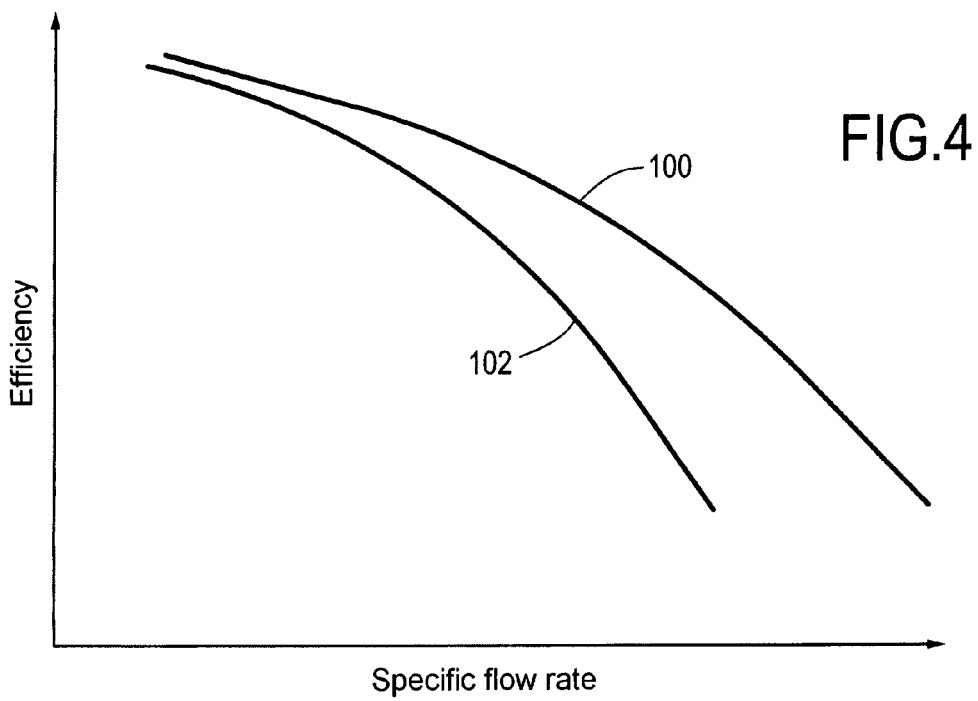
FIG. 4 is a graph plotting the increase in efficiency obtained by a blade of the invention compared with that obtained by a prior art blade.

FIG. 4 shows the gain in efficiency obtained with a blade of the invention compared with a prior art blade.

This figure plots a curve 100 showing the efficiency of a turbomachine fan fitted with blades of the invention and a curve 102 showing the efficiency of a fan fitted with blades of the prior art. Efficiency is expressed as a function of the specific flow rate of the fan.

The Applicant has found that the efficiency obtained by blades of the invention is considerably greater than that obtained by prior art blades. In particular, at high specific flow rate, the blade of the invention makes it possible to obtain a large increase in the efficiency of the turbomachine fan. Comparing curves 100 and 102 in FIG. 4 corroborates this point clearly.

What is claimed is:

1. A turbomachine blade comprising:
   a plurality of blade sections stacked along a radial axis, each blade section extending along a longitudinal axis between a leading edge and a trailing edge and along a tangential axis between a pressure side face and a suction side face, the stack of blade sections being subdivided along the radial axis into a bottom stack, an intermediate stack, and a top stack, the bottom stack extending from a root of the blade to a bottom limit of the intermediate stack, the intermediate stack extending from the bottom limit to a top limit, and the top stack extending from the top limit of the intermediate stack to a tip of the blade, wherein:
   the projection of a line interconnecting the leading edges of the blade sections of the bottom stack onto a mid-plane formed by the longitudinal axis and the radial axis presents a first longitudinal angle of inclination towards the leading edge that lies in the range 10° to 25° relative to said radial axis;
   the projection of a line interconnecting the leading edges of the blade sections of the intermediate stack onto the mid-plane presents a second longitudinal angle of inclination towards the trailing edge lying in the range 10° to 25° relative to said radial axis;
   the projection of a line interconnecting the leading edges of the blade sections of the top stack onto the mid-plane presents a third longitudinal angle of inclination towards the trailing edge that lies in the range 20° to 50° relative to said radial axis; and
   the bottom limit of the intermediate stack of the blade sections lies between 30% to 40% of the total radial height of the stack of blade sections measured from the root of the blade.

2. A blade according to claim 1, wherein:
   the bottom stack also possesses a line interconnecting the centers of gravity of its blade sections which, in projection onto a tangential plane formed by the longitudinal axis and the radial axis, presents a first tangential angle of inclination lying in the range −10° to 10° relative to the radial axis;
   the intermediate stack also possesses a line interconnecting the centers of gravity of its blade sections having a projection onto the tangential plane that presents a second tangential angle of inclination lying in the range −20° to 0° relative to the radial axis; and
   the top stack also possesses a line interconnecting the centers of gravity of its blade sections having a projection onto the tangential plane that presents a third tangential angle of inclination lying in the range −40° to −20° relative to the radial axis.

3. A blade according to claim 1, wherein the projection of the line interconnecting the leading edges of the top stack onto the mid-plane further presents, for the tip sections a fourth longitudinal angle of inclination towards the leading edge.

4. A blade according to claim 1, wherein the intermediate and top stacks extend over substantially identical radial heights.

5. A turbomachine fan, comprising a plurality of blades according to claim 1.

6. A turbomachine, including a plurality of blades according to claim 1.

7. A blade according to claim 1, wherein the bottom stack also possesses a line interconnecting the centers of gravity of its blade sections which, in projection onto a tangential plane formed by the longitudinal axis and the radial axis, presents a first tangential angle of inclination lying in the range −10° to 10° relative to the radial axis.

8. A blade according to claim 1, wherein the intermediate stack also possesses a line interconnecting the centers of gravity of its blade sections which, in projection onto a tangential plane formed by the longitudinal axis and the radial axis, presents a second tangential angle of inclination lying in the range −20° to 0° relative to the radial axis.

9. A blade according to claim 1, wherein the top stack also possesses a line interconnecting the centers of gravity of its blade sections which, in projection onto a tangential plane formed by the longitudinal axis and the radial axis, presents a third tangential angle of inclination lying in the range −40° to −20° relative to the radial axis.

* * * * *